United States Patent
Maarek et al.

(10) Patent No.: US 9,830,556 B2
(45) Date of Patent: Nov. 28, 2017

(54) SYNTHETIC QUESTION FORMULATION

(71) Applicant: Excalibur IP, LLC, New York, NY (US)

(72) Inventors: Yoelle Maarek, Haifa (IL); Avihai Mejer, Atlit (IL); Idan Szpektor, Kfar Saba (IL); Dan Pelleg, Haifa (IL)

(73) Assignee: Excalibur IP, LLC, New York, NY (US)

( * ) Notice: Subject to any disclaimer, the term of this patent is extended or adjusted under 35 U.S.C. 154(b) by 378 days.

(21) Appl. No.: 14/284,180

(22) Filed: May 21, 2014

(65) Prior Publication Data

US 2015/0339590 A1 Nov. 26, 2015

(51) Int. Cl.
*G06N 99/00* (2010.01)
*G06F 17/30* (2006.01)
*H04L 29/08* (2006.01)

(52) U.S. Cl.
CPC ..... *G06N 99/005* (2013.01); *G06F 17/30477* (2013.01); *G06F 17/30634* (2013.01); *G06F 17/30637* (2013.01); *G06F 17/30643* (2013.01); *G06F 17/30864* (2013.01); *H04L 67/02* (2013.01)

(58) Field of Classification Search
None
See application file for complete search history.

(56) References Cited

U.S. PATENT DOCUMENTS

| 7,617,205 B2 | 11/2009 | Bailey et al. | |
|---|---|---|---|
| 8,135,712 B1 | 3/2012 | Coladonato et al. | |
| 2009/0281997 A1 | 11/2009 | Jain | |
| 2013/0282704 A1 | 10/2013 | Pantel et al. | |
| 2014/0304198 A1* | 10/2014 | Oral | G06F 17/30861 706/12 |
| 2015/0039536 A1* | 2/2015 | Cook | G06N 5/02 706/11 |

FOREIGN PATENT DOCUMENTS

WO 2007095599 A2 8/2007

OTHER PUBLICATIONS

Dror et al, From Query to Question in One Click: Suggesting Synthetic Questions to Searchers, 2013.*
Wang et al, Probabilistic Tree-Edit Models with Structured Latent Variables for Textual Entailment and Question Answering, 2010.*
Figueroa et al, Learning to Rank Effective Paraphrases for Community Question Answering, 2013.*
Lin; "Automatic Question Generation from Queries", Microsoft Research Asia, Beijing, China, 2008, 2 pages.

(Continued)

*Primary Examiner* — Stanley K Hill
*Assistant Examiner* — Mikayla Chubb
(74) *Attorney, Agent, or Firm* — Berkeley Law & Technology Group, LLP

(57) ABSTRACT

Briefly, embodiments disclosed herein may relate to formulating synthetic questions, such as in response to a search query, for example. Candidate synthetic questions may be presented to a user who may initiate a search at least in part by selecting one or more candidate synthetic questions, for example, in an embodiment.

15 Claims, 8 Drawing Sheets

(56) References Cited

OTHER PUBLICATIONS

Kalady, Elikkottil, and Das; "Natural Language Question Generation Using Syntax and Keywords", Proceedings of the Third Workshop on Question Generation, 10 pages.

McDonald, Crammer and Pereira; "Online Large-Margin Training of Dependency Parsers", Department of Computer and Information Science, University of Pennsylvania, Philadelphia, PA, USA, 8 pages.

Crammer, McDonald, and Pereira; "Scalable Large-Margin Online Learning for Structured Classification", Department of Computer and Information Science, University of Pennsylvania, Philadelphia, PA, USA, 7 pages.

"The Question Generation Shared Task and Evaluation Challenge: Workshop Report", Sponsored by National Science Foundation, Rus and Graesser, eds., Institute for Intelligent Systems, University of Memphis, Memphis, TN, USA, 2009, 50 pages.

Zhao, Wang, Li, Liu, and Guan; "Automatically Generating Questions from Queries for Community-based Question Answering", Proceedings of the $5^{th}$ International Joint Conference on Natural Language Processing, pp. 929-937, Chiang Mai, Thailand, 2011.

Zheng, Si, Chang, and Zhu; "K2Q: Generating Natural Language Questions from Keywords with User Refinements", Proceedings of the $5^{th}$ International Joint Conference on Natural Language Processing, pp. 947-955, Chiang Mai, Thailand, 2011.

Agarwal, Shah and Mannem; "Automatic Question Generation using Discourse Cues", Proceedings of the Sixth Workshop on Innovative Use of NLP for Building Educational Applications, pp. 1-9, Portland, OR, USA, Jun. 24, 2011.

Ali, Chali and Hasan; "Automation of Question Generation From Sentences", Proceedings of the Third Workshop on Question Generation, 11 pages.

Crammer, Dekel, Keshet, Shalev-Shwartz, Singer; "Online Passive-Aggressive Algorithms", Journal of Machine Learning Research 7 (2006), pp. 551-585.

International Search Report, International Application No. PCT/US2015/031453, dated Aug. 20, 2015, 4 pgs.

Written Opinion of the International Searching Authority, International Application No. PCT/US2015/031453, dated Aug. 20, 2015, 5 pgs.

* cited by examiner

SYNTHETIC QUESTION FORMULATION

BACKGROUND

Field

Subject matter disclosed herein may relate to formulating synthetic questions, such as in response to a search query, for example.

Information

With networks, such as the Internet, gaining tremendous popularity, and with the vast multitude of content, such as pages and/or other documents and/or other media content and/or applications, becoming available to users, such as via the World Wide Web (web), it may be desirable to provide more efficient and/or more streamlined approaches to gather, organize and/or display content, such as digital content, that may be desired by and/or useful to a user, for example. Internet-type business entities, such as Yahoo!, for example, may provide a wide range of content such as applications and/or other digital content that may be made available to users via the Web. In some circumstances, challenges may be faced in determining which content, for example, to display, such as to a user via a web page. In addition, content being sought may not yet exist.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

FIG. 1 is an illustration of an example web page display depicting example synthetic questions, according to an embodiment.

FIG. 3 is an illustration of an example web page display depicting example synthetic questions, according to an embodiment.

Figure 2:
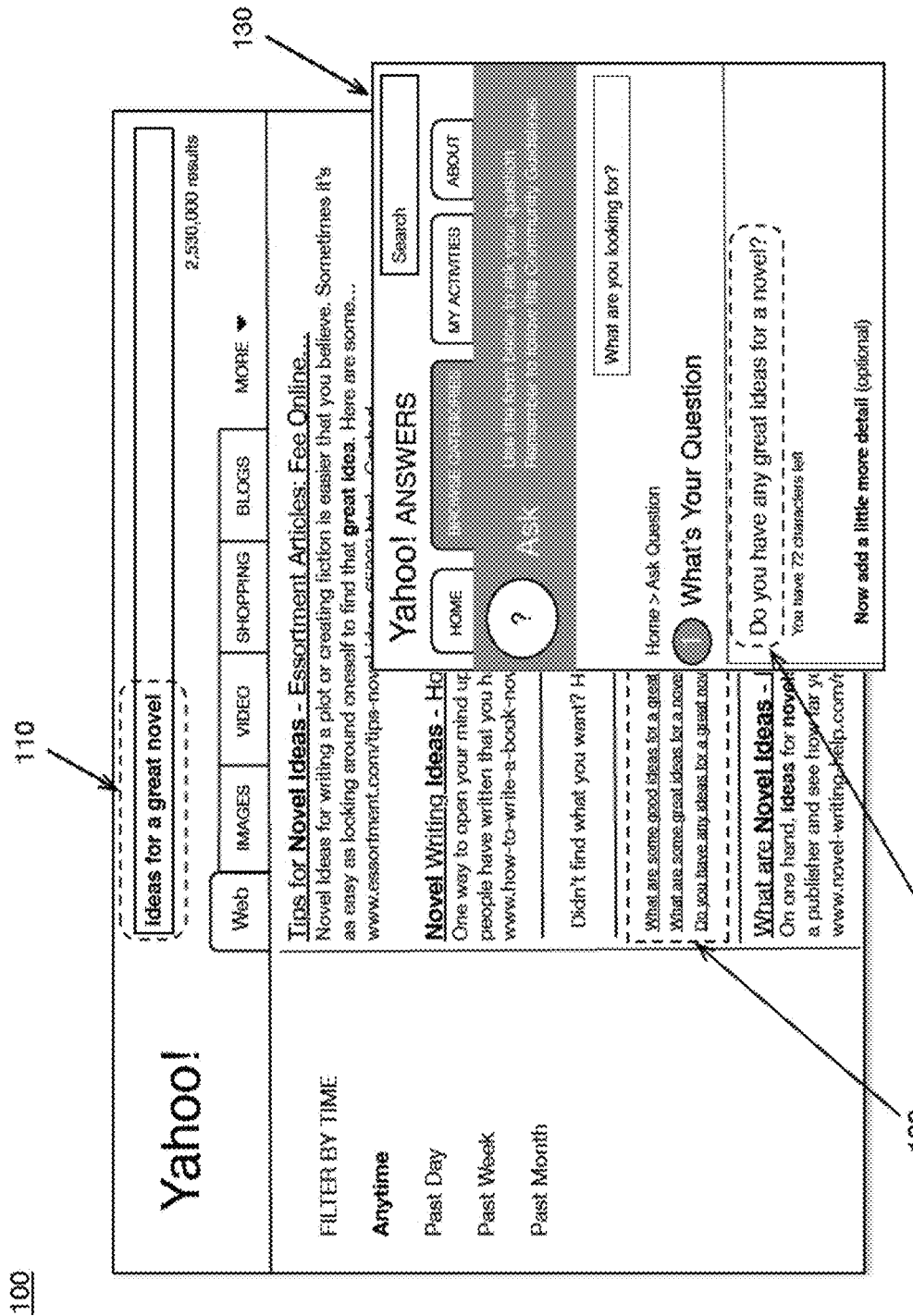
FIG. 2 is an illustration of an example web page display depicting an example selected question, according to an embodiment.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/ or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

In the following detailed description, numerous specific details are set forth to provide a thorough understanding of claimed subject matter. For purposes of explanation, specific numbers, systems and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes and/or equivalents may occur to those skilled in the art. It is, therefore, to be understood that appended claims are intended to cover any and all modifications and/or changes as fall within claimed subject matter.

Reference throughout this specification to one implementation, an implementation, one embodiment, an embodiment and/or the like may mean that a particular feature, structure, or characteristic described in connection with a particular implementation or embodiment may be included in at least one implementation or embodiment of claimed subject matter. Thus, appearances of such phrases, for example, in various places throughout this specification are not necessarily intended to refer to the same implementation or to any one particular implementation described. Furthermore, it is to be understood that particular features, structures, or characteristics described may be combined in various ways in one or more implementations. In general, of course, these and other issues may vary with context. Therefore, particular context of description or usage may provide helpful guidance regarding inferences to be drawn.

Operations and/or processing, such as in association with networks, such as communication networks, for example, may involve physical manipulations of physical quantities. Typically, although not necessarily, these quantities may take the form of electrical and/or magnetic signals capable of, for example, being stored, transferred, combined, processed, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these or similar terms are to be associated with appropriate physical quantities and are intended to merely be convenient labels.

Likewise, in this context, the terms "coupled", "connected," and/or similar terms, may be used. It should be understood that these terms are not intended as synonyms. Rather, "connected" may be used to indicate that two or more elements or other components, for example, are in direct physical and/or electrical contact; while, "coupled" may mean that two or more components are in direct physical or electrical contact; however, "coupled" may also mean that two or more components are not in direct contact, but may nonetheless co-operate or interact. The term coupled may also be understood to mean indirectly connected, for example, in an appropriate context.

The terms, "and", "or", "and/or" and/or similar terms, as used herein, may include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms may be used to describe any feature, structure, and/or characteristic in the singular and/or may be used to describe a plurality or some other combination of features, structures and/or characteristics. Though, it should be noted that this is merely an illustrative example and claimed subject matter is not limited to this example. Again, particular context of description or usage may provide helpful guidance regarding inferences to be drawn.

It should be understood that for ease of description a network device may be embodied and/or described in terms of a computing device. However, it should further be understood that this description should in no way be construed that claimed subject matter is limited to one embodiment, such as a computing device or a network device, and, instead, may be embodied as a variety of devices or combinations thereof, including, for example, one or more illustrative examples.

In this context, the term network device refers to any device capable of communicating via and/or as part of a network. Network devices may be capable of sending and/or receiving signals (e.g., signal packets), such as via a wired or wireless network, may be capable of performing arithmetic and/or logic operations, processing and/or storing signals, such as in memory as physical memory states, and/or may, for example, operate as a server. Network devices capable of operating as a server, or otherwise, may include, as examples, dedicated rack-mounted servers, desktop computers, laptop computers, set top boxes, tablets, netbooks, smart phones, integrated devices combining two or more features of the foregoing devices, the like or any combination thereof.

A network may comprise two or more network devices and/or may couple network devices so that signal communications, such as in the form of signal packets, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices or one or more server devices, as appropriate. Along similar lines, references to a "database" are understood to mean, one or more databases and/or portions thereof, as appropriate.

A network may also include now known, or to be later developed arrangements, derivatives, and/or improvements, including, for example, past, present and/or future mass storage, such as network attached storage (NAS), a storage area network (SAN), and/or other forms of computer and/or machine readable media, for example. A network may include the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures or may be compliant and/or compatible with differing protocols, such as communication protocols (e.g., network communication protocols), may interoperate within a larger network. Various types of devices may be made available so that device interoperability is enabled and/or, in at least some instances, may be transparent to the devices. In this context, the term transparent refers to devices communicating via a network in which the devices are able to communicate via intermediate devices, but without the communicating devices necessarily specifying one or more intermediate devices and/or may include communicating as if intermediate devices are not necessarily involved in communication transmissions. For example, a router may provide a link between otherwise separate and/or independent LANs. In this context, a private network refers to a particular, limited set of network devices able to communicate with other network devices in the particular, limited set, such as via signal packet transmissions, for example, without a need for re-routing and/or redirecting such communications. A private network may comprise a stand-alone network; however, a private network may also comprise a subset of a larger network, such as, for example, without limitation, the Internet. Thus, for example, a private network "in the cloud" may refer to a private network that comprises a subset of the Internet, for example. Although signal packet transmissions may employ intermediate devices to exchange signal packet transmissions, those intermediate devices may not necessarily be included in the private network by not being a source or destination for one or more signal packet transmissions, for example. As another example, a logical broadcast domain may comprise an example of a private network. It is understood in this context that a private network may provide outgoing communications to devices not in the private network, but such devices outside the private network may not direct inbound communications to devices included in the private network.

The Internet refers to a decentralized global network of interoperable networks, including devices that are part of those interoperable networks. The Internet includes local area networks (LANs), wide area networks (WANs), wireless networks, and/or long haul public networks that, for example, may allow signal packets to be communicated between LANs. The terms world wide web (WWW), web, and/or similar terms may also be used, although the terms "WWW" and/or "web" refer to a sub-portion of the Internet that complies with the Hypertext Transfer Protocol or HTTP. It is noted that there are several versions of the Hypertext Transfer Protocol. Signal packets, also referred to as signal packet transmissions, may be communicated between nodes of a network, where a node may comprise one or more network devices, for example. As an illustrative example, but without limitation, a node may comprise one or more sites employing a local network address. Likewise a device, such as a network device, may be associated with that node. A signal packet may, for example, be communicated via a communication channel or a communication path comprising the Internet, from a site via an access node coupled to the Internet. Likewise, a signal packet may be forwarded via network nodes to a target site coupled to a local network, for example. A signal packet communicated via the Internet, for example, may be routed via a path comprising one or more gateways, servers, etc. that may, for example, route a signal packet in accordance with a target address and availability of a network path of network nodes to a target address.

Physically connecting a network via a hardware bridge as one example may be done, although other approaches also exist. A hardware bridge, however, may not typically include a capability of interoperability via higher levels of a network protocol. A network protocol refers to a set of signaling conventions for communications between or among devices in a network, typically network devices; for example, devices that substantially comply with the protocol or that are substantially compatible with the protocol. In this context, the term "between" and/or similar terms are understood to include "among" if appropriate for the particular usage. Likewise, in this context, the terms "compatible with", "comply with" and/or similar terms are understood to include substantial compliance or substantial compatibility.

Typically, a network protocol has several layers. These layers may be referred to here as a communication stack. Various types of communications may occur across various layers. For example, as one moves higher in a communication stack, additional functions may be available by transmitting communications that are compatible and/or compliant with a particular network protocol at these higher layers. In contrast, a virtual private network (VPN) may enable a remote device to communicate via a local network. A router may allow communications in the form of transmissions (e.g., signal packets), for example, to occur from a remote device to a VPN server on a local network. A remote device may be authenticated and a VPN server, for example, may create a special route between a local network and the remote device through an intervening router.

Although claimed subject matter is not in particular limited in scope to the Internet or to the web, it may without limitation provide a useful example of an embodiment for purposes of illustration. As indicated, the Internet may comprise a worldwide system of interoperable networks, including devices within those networks. The Internet has evolved to a public, self-sustaining facility that may be accessible to tens of millions of people or more worldwide. Also, in an embodiment, and as mentioned above, the terms "WWW" and/or "web" refer to a sub-portion of the Internet that complies with the Hypertext Transfer Protocol or HTTP. The web, therefore, in this context, may comprise an Internet service that organizes stored content, such as, for example, text, images, video, etc., through the use of hypermedia, for example. A HyperText Markup Language ("HTML"), for example, may be utilized to specify content and/or format of hypermedia type content, such as in the form of a file or an "electronic document," such as a web page, for example. An Extensible Markup Language (XML) may also be utilized to specify content and/or format of hypermedia type content, such as in the form of a file or an "electronic document," such as a web page, in an embodiment. Of course, HTML and XML are merely example languages provided as illustrations. Claimed subject matter is not intended to be limited to examples provided as illustrations, of course.

As used herein, a "web site" may refer to a collection of related web pages, in an embodiment. Also as used herein, "web page" may relate to any electronic file or electronic document, such as may be accessible via a network, by specifying a URL for accessibility via the web, in an example embodiment. As alluded to above, in one or more embodiments, a web page may comprise content coded using one or more languages, such as, for example, HTML and/or XML, although claimed subject matter is not limited in scope in this respect. Also, in one or more embodiments, application developers may write code in the form of JavaScript, for example, to provide content to populate one or more templates, such as for an application. However, JavaScript is merely an example programming language. As was mentioned, claimed subject matter is not limited to examples or illustrations.

As used herein, the term "entry", "electronic entry", "document", "electronic document", "content", "digital content", "item", and/or similar terms are meant to refer to signals and/or states in a format, such as a digital format, that may be perceived by a user if displayed and/or otherwise played by a device, such as a digital device, such as, for example, a computing device. For one or more embodiments, an electronic document may comprise a web page coded in a markup language, such as, for example, HTML (hypertext markup language). In another embodiment, an electronic document may comprise a portion or a region of a web page. However, claimed subject matter is not limited in these respects. Also, for one or more embodiments, an electronic document or electronic entry may comprise a number of components. Components in one or more embodiments may comprise text, for example, as may be displayed on a web page. Also for one or more embodiments, components may comprise a graphical object, such as, for example, an image, such as a digital image, and/or sub-objects, such as attributes thereof. In an embodiment, digital content may comprise, for example, digital images, digital audio, digital video, and/or other types of electronic documents.

As mentioned, with networks, such as the Internet, gaining tremendous popularity, and with the vast multitude of pages and/or other documents and/or other content, such as media content, and/or applications, becoming available, such as to users, via the World Wide Web (web), for example, it may be desirable to provide more efficient and/or more streamlined approaches to gather, organize and/or display content, such as digital content, that may be desired by and/or useful to a user. Internet-type business entities, such as Yahoo!, for example, may provide a wide range of content such as applications, and/or other digital content that may be made available to users via the Web. In some circumstances, challenges may be faced in determining which content, for example, to display, such as to a user, via a web page.

In general, conventional content retrieval systems, such as, for example, a search engine, may tend to focus on user experiences in which a user specifies his or her intent as explicitly as possible, and the systems may retrieve results in an attempt to meet the intent as it is expressed by the user. Results may be ranked according to various criteria and may be presented to a user as a list. For example, a user may initiate a web search by submitting a query including one or more search terms, and a content retrieval service may respond by delivering a ranked list of hyperlinks to a user computing platform, typically via a client-server type interaction over a network, such as the Internet, for example. In some circumstances, a content retrieval system may be judged to be successful if the system is able to show a user a relatively small number of results while still at least partially meeting the user's expressed intent.

Conventional retrieval systems, such as a search engine, for example, may be less desirable and/or not perform as well in situations where the system fails to crawl, index, and/or rank relevant content adequately enough to satisfy a user's expressed intent. Conventional retrieval systems may also be less desirable and/or perform less well in situations where a user does not adequately express his or her intent, such as, for example, in situations wherein a user does not yet know precisely what he or she is looking for, for example. Situations may include, for example, content "browsing" and/or dynamic search situations wherein a user may desire to be more broadly educated before having an appreciation regarding how to express intent in a meaningful manner. Other situations in which conventional retrieval systems may be less desirable and/or may perform less well may include situations wherein relevant content for a user's specified intent does not exist on the web at the time of the user's query, for example.

In situations in which relevant content for a user's specified content is not readily found by conventional retrieval systems (e.g., search engines) on the web, users may take advantage of community question answering (CQA) sites, such as Yahoo! Answers, for example. To utilize a CQA site, a user may formulate questions that are intended to be read and understood by other human beings. It is not a trivial effort to form effective questions to elicit answers from other users, particularly if a user may only have superficial knowledge of a subject, for example. Furthermore, in general, a searching paradigm in which users may be experienced at generating search queries may not provide appropriate skills for formulating questions for a community question site, for example. Therefore, embodiments described herein may related to helping a user formulate questions, and more particularly, may relate to helping a user formulate questions that may better express a user's intent and/or that may better elicit meaningful answers from other users, for example. Embodiments, such as those described herein, for example, may encourage users to ask questions, for example, at a CQA site, rather than merely seek results provided by automated search engines in response to query submissions.

In general, for example, a user may submit a query to a search engine, such as an Internet search engine. At least in part in response to submission of a query, one or more synthetic questions may be generated in an embodiment. Furthermore, in an embodiment, generated synthetic questions may be displayed to the user. In this context, the term synthetic question refers to a question that may be generated based at least in part on one or more template question forms and based at least in part on the terms employed in a submitted search query. Template question forms for synthetic questions shall be discuss in more detail infra. However, as an example, a synthetic template question form may comprise "how can I T1 my T2 T3?" where T1, T2 and T3 in the example may comprise terms from a search query. Synthetic questions may, for example, assist a user obtain that content may be difficult to obtain or that may not be obtainable via a conventional query-type search, also described in more detail infra. In an embodiment, generated synthetic questions may be displayed to a user along with query-type search results to encourage a user to expand his or her research to a CQA site, for example. Likewise, synthetic questions may help a user focus and/or more meaningfully express a query.

In one example illustrative embodiment, a set of synthetic questions may be presented to a user, such as, for example, by way of a browser application executed on a user computing device, and the user may select one or more of the synthetic questions. That is, as one example, synthetic questions may be generated via a server that may provide the generated questions to a user via a client browser. Of course, other mechanisms may also be employed to provide generated synthetic questions, such as a mobile application executing on a mobile device and/or other approaches. Likewise, in an embodiment, by selecting one or more of the synthetic questions, a user may initiate presentation of the selected question (or more than one selected question, for example) to a CQA site, although claimed subject matter is not limited in scope in these respects. Also, in an embodiment, synthetic questions may be generated to be substantially grammatically correct and/or may employ language natural enough to be readily understood by human beings, also described in more detail below.

Further, in an embodiment, a set of synthetic questions may be generated in a manner to provide improved diversity among the questions presented, for example. In an embodiment, more diversity among the synthetic questions may be achieved, at least in part, by not including near-duplicate and/or duplicate questions, as explained in more detail below. Likewise, in an embodiment, a question quality score may be generated. A quality score may not necessarily be presented to a user but may be useful in connection with generation and/or presentation of generated questions. For example, quality scores may be used for question filtering and/or for determining whether to present synthetic questions at all in an embodiment.

Figure 1:
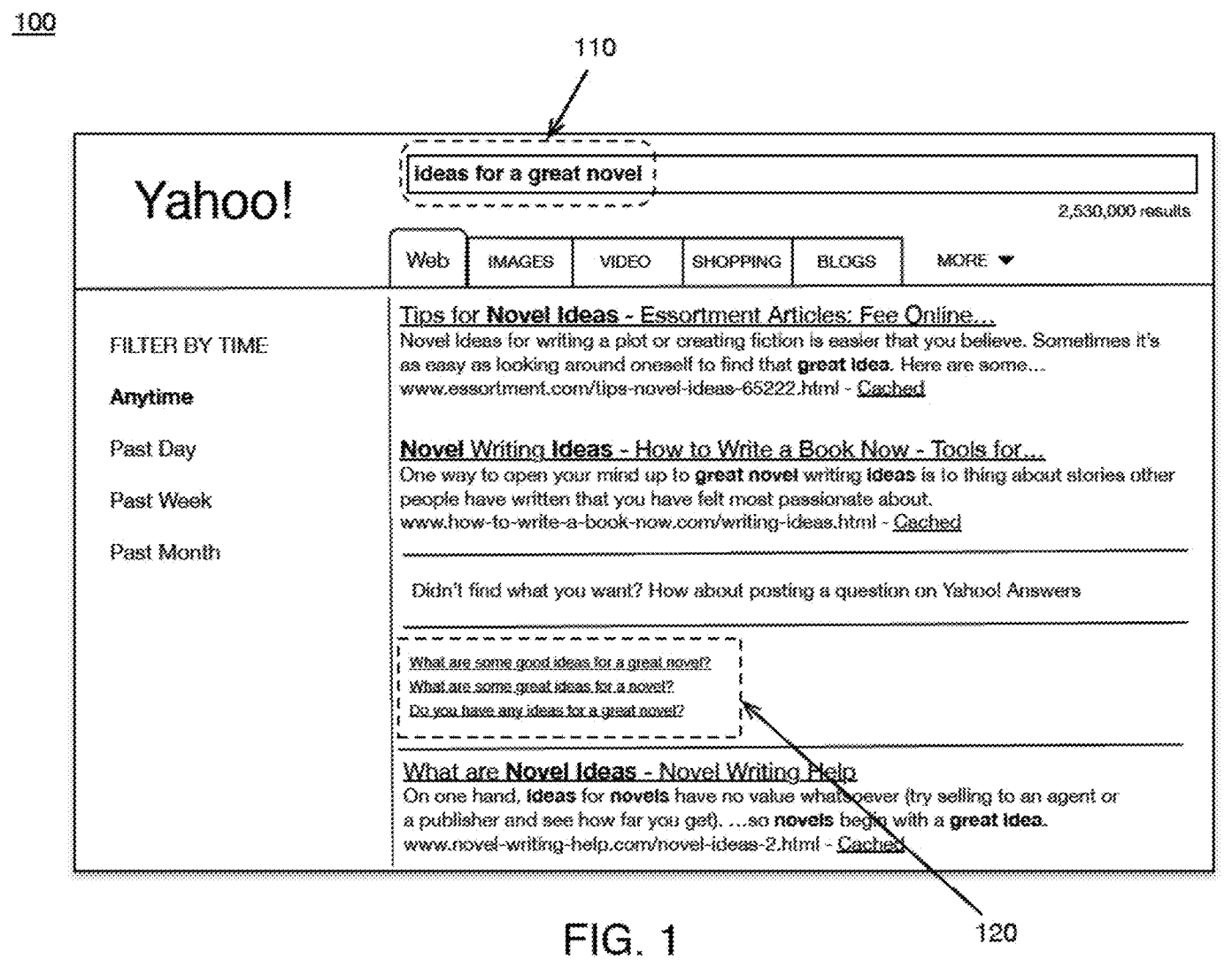

FIG. 1 is an illustration of an example web page display depicting example synthetic questions, according to an embodiment. In an embodiment, a user may submit one or more query terms, such as query 110 "ideas for a great novel", by way of a browser application executed on a user computing device, such as via a client-server type network interaction. At least in part in response to a user submitting one or more query terms, such as query 110, a user computing device may transmit query terms to a web server. A web server may retrieve one or more search results and may transmit a web page, such as web page 100, containing search results to a user computing device. In an embodiment, a user computing device may display a web page containing search results, such as web page 100, to a user by way of a browser application.

Also, in an embodiment, a web server and/or another network entity may generate a plurality of synthetic questions, such as synthetic questions 120, at least in part in response to receiving one or more query terms, such as query 110, and may transmit synthetic questions to a user computing device, such as for display to a user. In an embodiment, a user may select one or more synthetic questions, such as synthetic questions 120, by an user-device interaction technique, such as by clicking with a mouse and/or by a touch-screen display, for example, to further refine a user's search and/or to seek additional content.

By selecting one or more synthetic questions, a user may in an embodiment, for example, initiate presentation of one or more selected questions to a CQA site, although claimed subject matter is not limited in scope in these respects. Also, in an embodiment, synthetic questions may be generated to be substantially grammatically correct and/or with language natural enough to be readily understood by human beings. As mentioned previously, questions may be generated and/or presented to a user, such as in an attempt to help a user obtain desired content, such as to help a user more effectively access one or more CQA sites, for example.

FIG. 2 is an illustration of an example web page display depicting an example selected synthetic question, according to an embodiment. FIG. 2 depicts example web page 100 showing search results for user-submitted query terms 110, such as discussed above in connection with FIG. 1. As mentioned above, a content retrieval system may generate a plurality of synthetic questions based at least in part on one or more query terms, such as query 110, submitted by a user. Also, as mentioned above, synthetic questions, such as synthetic questions 120, may be displayed to a user in an embodiment, and a user may select one or more questions. In an embodiment, a selected synthetic question, such as one or more of synthetic questions 120, may be posted to a CQA site, such as, for example, Yahoo! Answers 130, to help a user expand his or her search for desired content, for example.

For example, a user may seek ideas for a great novel. Thus, a user may submit a query, such as query 110 "ideas for great novel", to a search engine by way of a browser application. In response, a content retrieval system may display to a user a list of user query-type search results, for example. A content retrieval system may also, in an embodiment, generate one or more synthetic questions, such as, in an embodiment, for presentation to a user. Of course, an aspect of an embodiment may include an evaluation of whether or not to present generated synthetic questions, such as based at least in part on a generated quality score, for example.

Nonetheless, for the example depicted in FIGS. 1 and 2, a content retrieval system may provide synthetic questions 120 "What are good ideas for a great novel?", "What are some great ideas for novel?", and "Do you have any ideas for great novel?". In an embodiment, particular synthetic questions of a set of synthetic questions may be related one to another, at least in part. However, in an embodiment, it may be desirable for duplicates or near duplicates to not be included.

As depicted in FIG. 2, at least in part in response to a content retrieval system receiving a user's selection of a synthetic question, such as, for example "Do you have any ideas for great novel?", a content retrieval system may post a selected question, such as selected question 140, to a CQA site, such as depicted at sample web page 130, for example. Additionally, because synthetic questions, such as synthetic questions 120, may be generated in a substantially grammatically correct manner and/or in a manner to be comprehended by a human reader, for example, in an embodiment, a user may be relieved of formulating questions to post to a CQA site, which may be a challenge or at least a chore. Thus, a user is able to continue to search for relevant content, and/or may be guided at least in part to relevant content via generation of synthetic questions.

Figure 3:
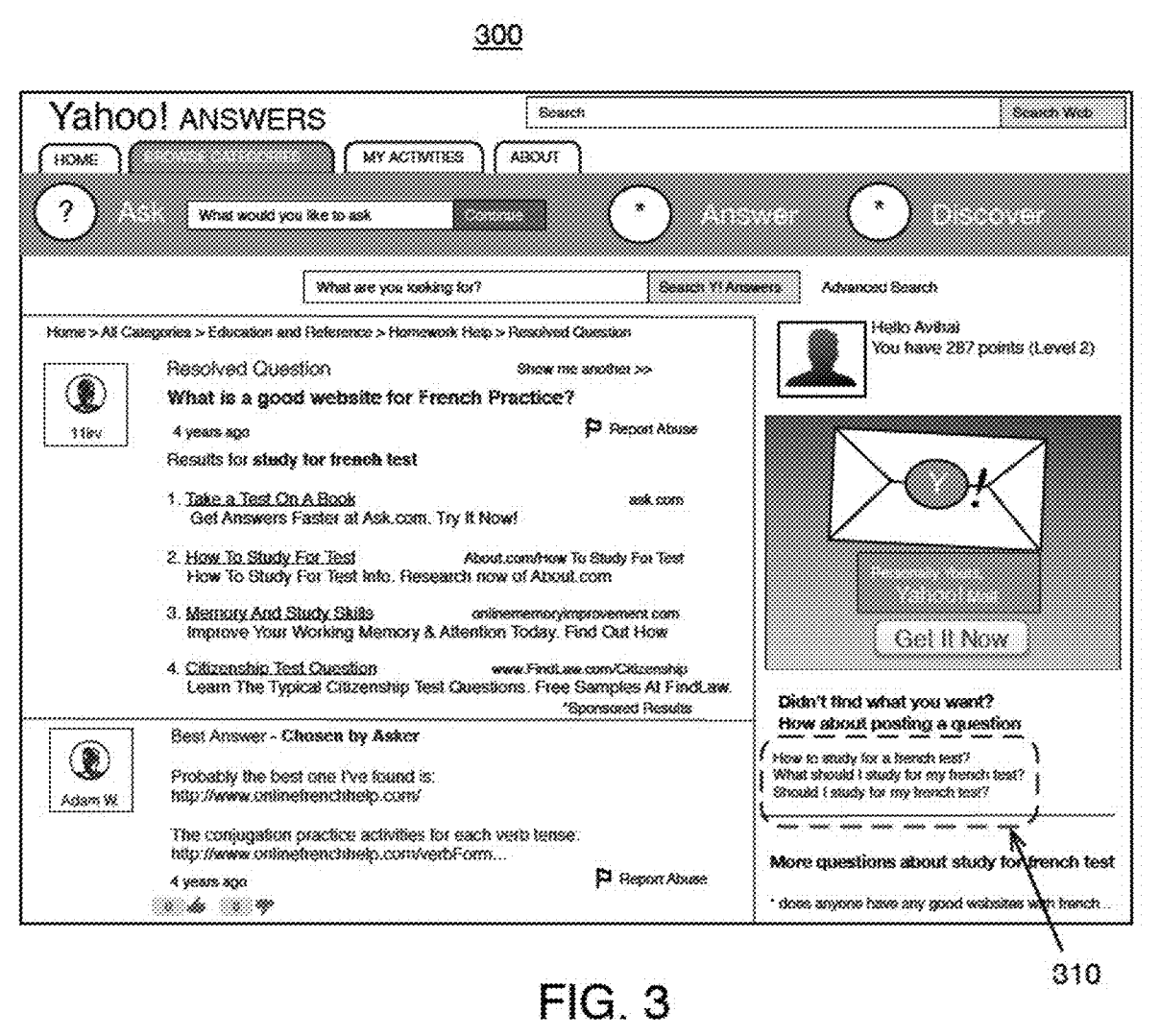

FIG. 3 is an illustration of an example web page display depicting example synthetic questions, according to an embodiment. In an embodiment, a user may land on a CQA site, such as Yahoo! Answers, while browsing the web. For example, a user may be directed to a CQA, such as CQA site 300, by a search engine in response to submitting one or more query terms, such as via a submitted search query. In an embodiment, CQA site 300 may display one or more synthetic questions, such as synthetic questions 310, to encourage search refinement. In this manner, a user may become a more active participant in a content search and/or retrieval process, and a user may be more likely to find content sufficiently relevant to a particular intent.

Figure 4:
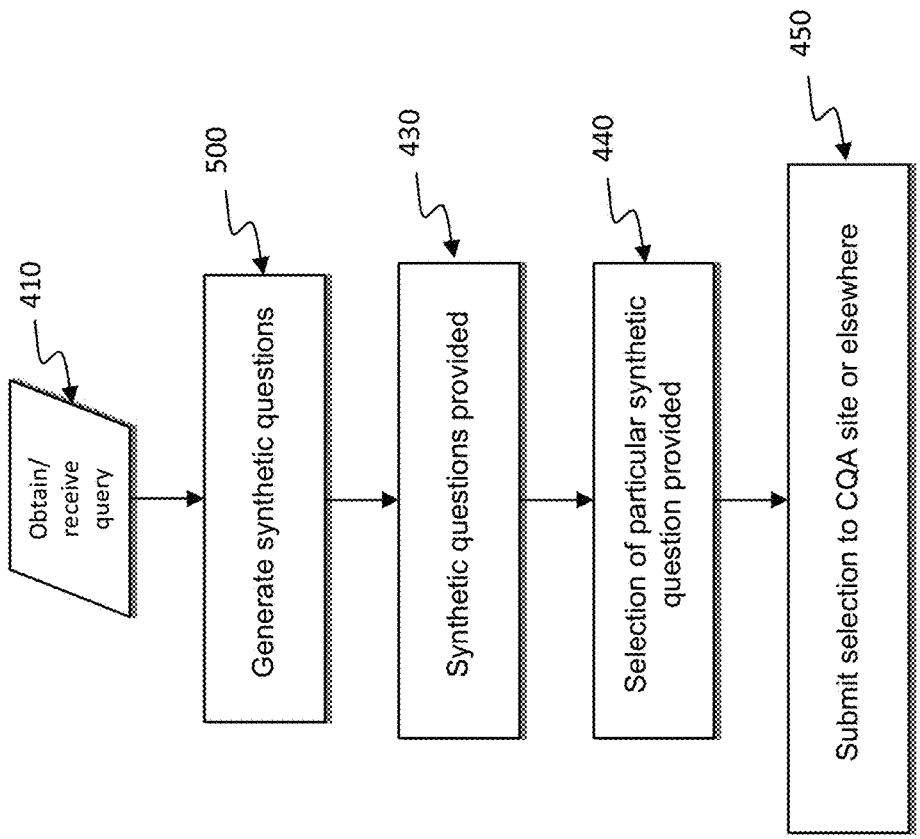
FIG. 4 is a schematic diagram illustrating an example process for generating synthetic questions, according to an embodiment.

FIG. 4 is a schematic diagram illustrating an example process for generating synthetic questions, according to an embodiment, such as depict by flow chart 400. As depicted at block 410, a query may be obtained, such as from a user. For example, a user may submit one or more query terms to a search engine, in an embodiment. At block 500, a system, such as a content retrieval system, may generate a set of one or more synthetic questions. For example, one or more synthetic questions may be generated, at least in part, based on a user's query in an embodiment. Additionally, in an embodiment, synthetic questions may be provided, such as depicted by block 430. In one embodiment, generated questions may be transmitted from a system, such as a content retrieval system, to a computing device, such as a user computing device, for display to a user. Likewise, alternatively, questions may be provided via user retrieval, such as from a location, such as a URL, as an example. At block 440, a system, such as a content retrieval system, may obtain a selection of one or more particular synthetic questions of the set of synthetic questions. A selection may be communicated in a variety of ways, of course, and claimed subject matter is not limited in scope to a particular approach. In an embodiment, the user may select a synthetic question, for example, by "clicking," such as with a mouse, for example. In another example embodiment, a user may select a synthetic question by interacting with a touch screen display, such as a tablet display. As mentioned, any user-device interaction approach may be employed. Likewise, communication may be via a browser executing on a user device or via another application program being executed, for example. Additionally, at block 450, a search may be performed by a content retrieval system based, at least in part, on one or more selected questions. In an embodiment, a search may comprise posting one or more synthetic questions to a CQA site, or elsewhere, to elicit responses, such as from other users. In another embodiment, a search may comprise a web search performed by a search engine. However, claimed subject matter is not limited in scope to the particular examples disclosed herein.

Embodiments in accordance with claimed subject matter may include all of, more than, or less than blocks 410, 500, 430, 440, and/or 450. Additionally, the order of blocks 410, 500, 430, 440, and/or 450 is merely an example order, and claimed subject matter is not limited in scope in this respect.

Figure 5:
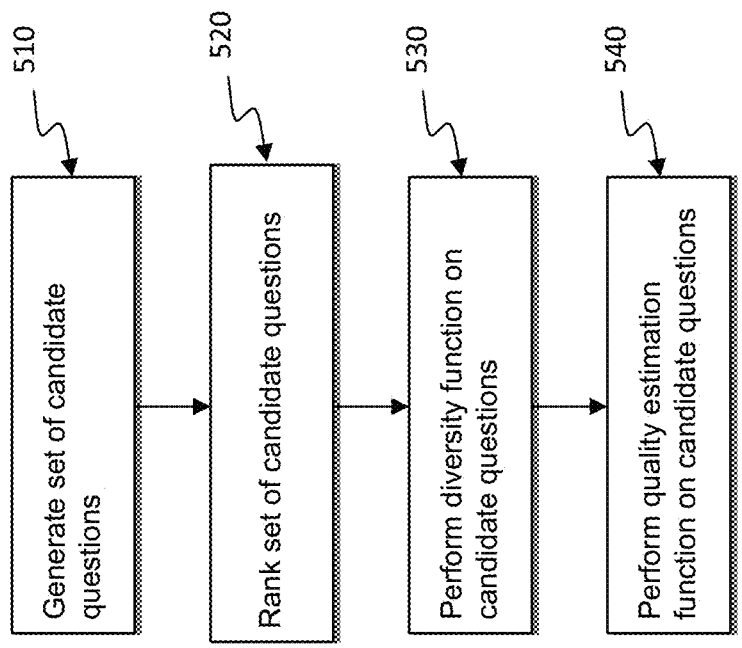
FIG. 5 is a schematic diagram illustrating an example process for generating synthetic questions, according to an embodiment.

FIG. 5 is a schematic diagram illustrating an example process 500 for generating synthetic questions, according to an embodiment. Of course, claimed subject matter is not limited to illustrative embodiments, such as FIG. 5, for example. As depicted at block 510, a set of candidate questions may be generated, in an embodiment. For example, a set of candidate questions may be generated, at least in part, in accordance with one or more query terms, such as provided by a user. Further, in an embodiment, the set of candidate questions may be ranked. For example, the set of candidate questions may be ranked to determine a subset of questions determined to be sufficiently relevant to a user's query, in an embodiment.

In an embodiment, ranking a set of candidate questions, such as depicted at block 520, for example, may comprise ranking a set of candidate questions at least in part according to a machine learning-to-rank function. Additionally, in an embodiment, ranking a set of candidate questions may comprise ranking at least in part according to a natural language function. In an embodiment, a natural language function may comprise ranking a set of candidate questions based at least in part on part of speech tags and/or dependency trees generated for individual questions of a set of candidate questions, for example. It is noted that an additional benefit of employing a machine learning-to-rank function and/or natural language function may include a type of synthetic question quality score, discussed more fully below.

Additionally, a diversity function may be performed on a candidate synthetic question set, such as depicted at block 530, for example to remove duplicate and/or nearly-duplicate questions, in an embodiment. Further, in an embodiment, a diversity function may comprise identifying redundant and/or nearly redundant questions from among at least a subset of candidate questions. For example, identifying redundant questions may comprise employing an edit-distance filter, described more completely below, on at least a subset of candidate questions, although claimed subject matter is not limited in scope in this respect. Further, performing a diversity function on a candidate question set may comprise employing a first-word filter to a subset of candidate questions, although, again, claimed subject matter is not limited in scope in this respect.

As mentioned, an additional benefit of employing a machine learning-to-rank function and/or natural language function may include a type of synthetic question quality score. For example, as depicted at block 540, a quality estimation function may be performed on a candidate synthetic question set, in an embodiment. For example, after training of a machine learning tool, candidate questions may be assigned a score as a result of employing machine learning. Thus, one or more thresholds may be employed so that questions not scoring sufficiently high may not be employed and/or may not be presented to a user, as an example.

Embodiments in accordance with claimed subject matter may include all of, fewer than, or more than blocks 510-540. Additionally, the order of blocks 510-540 is merely an example order, and claimed subject matter is not limited in this respect.

Figure 6:
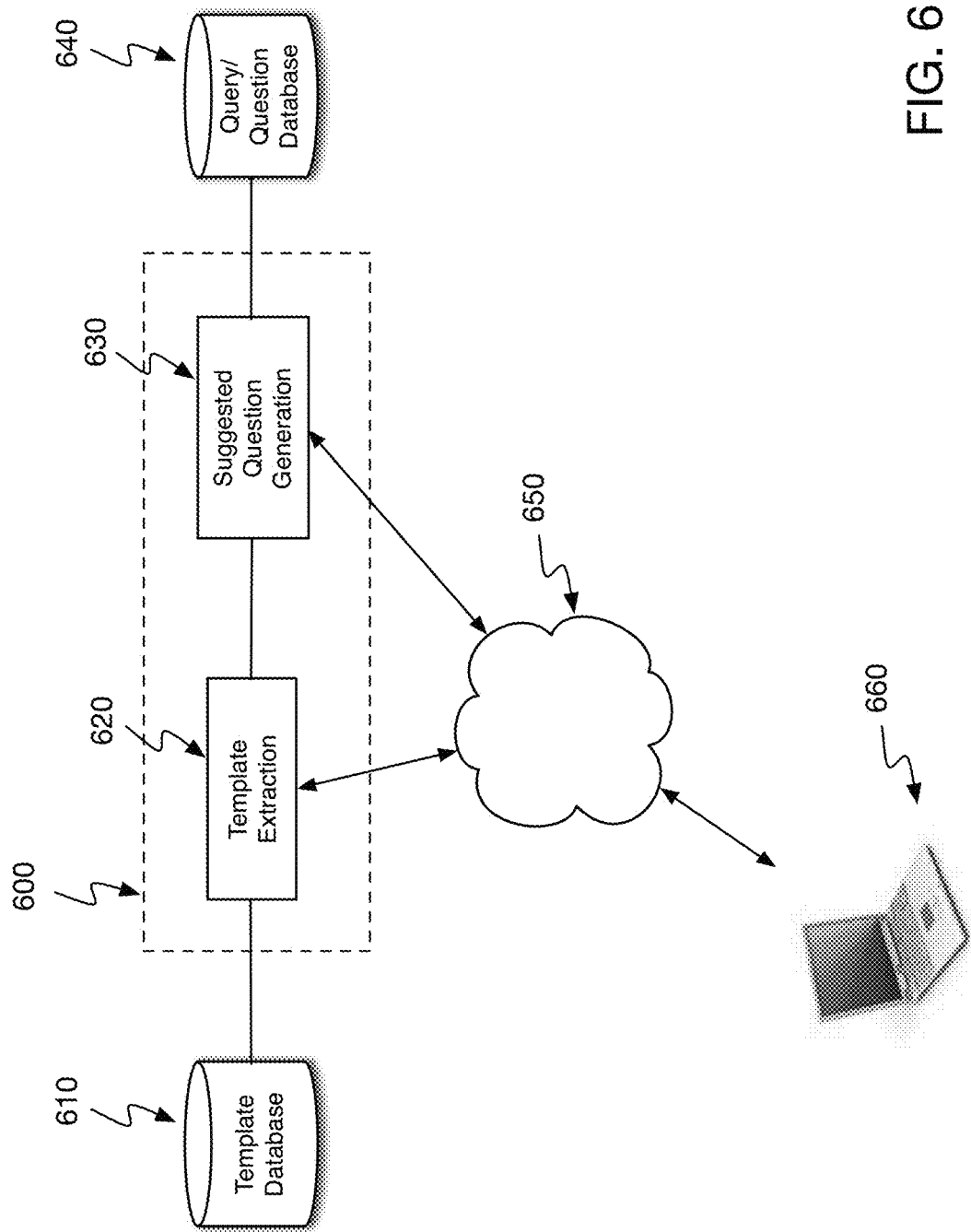
FIG. 6 is a schematic diagram depicting an example system for generating synthetic questions, according to an embodiment.

FIG. 6 is a schematic diagram depicting an example system for generating synthetic questions, according to an embodiment. In an embodiment, a system, such as system 600, may comprise a template extraction component, such as template extraction component 620, and a synthetic question generation component, such as synthetic question generation component 630. A user may interact with a computing device, such as computing device 660, to submit queries to a system, such as system 600, via a network, such as network 650. In an embodiment, a network, such as network 650, may comprise the Internet, and a system, such as system 600, may be part of the world-wide web, although claimed subject matter is not limited in these respects.

In an embodiment, a plurality of question templates may be generated at least in part by extracting question templates from a dataset of query/question pairs, such as, for example, from a query/question database, such as query/question database 640, for example. In an embodiment, a question template may be extracted by substituting one or more query terms identified in a question from a query/question database, such as database 640, with one or more respective other terms. For example, a query/question pair from a query/question database, such as database 640, may comprise a question "how can I fix my old car", and may comprise query terms "fix, old, car". In an embodiment, query terms "fix, old, car" from the question "how can I fix my old car" may be substituted with terms T1, T2, and T3 to form a question template "how can I T1 my T2 T3?" In an embodiment, a relatively large number of query/question pairs may be evaluated in this manner, and a plurality of synthetic question templates may be extracted and/or generated and stored in a database, such as synthetic question template database 610, for example. Also, in an embodiment, a filter function may be performed on a set of question templates. For example, in an embodiment, a database, such as synthetic template database 610, may store synthetic question templates that may be associated with ten or more queries, and synthetic question templates associated with fewer than ten queries may be discarded, although ten is merely a non-limiting example. In an example synthetic question template database, such as synthetic question template database 610, approximately 40,000 syntheic question templates may be stored along with their respective queries, for example. However, claimed subject matter is not limited in scope in these respects.

At least in part in response to receiving a query from computing device 620, one or more synthetic questions may be generated by synthetic question generation component 630. In an embodiment, one or more candidate synthetic question templates may be retrieved from synthetic question template database based at least in part on one or more query terms received from a computing device, such as computing device 620. In an embodiment, a set of possible candidate synthetic questions may be generated for a given query, and individual candidate synthetic questions may be ranked against one another. Also, in an embodiment, an individual candidate synthetic question may be represented as a "feature vector" in which, for example, characteristics of a candidate synthetic question may be represented as elements of a multi-dimensional vector.

Ranking candidate synthetic questions may comprise determining a baseline ranking score for individual candidate synthetic questions, and may also comprise a subsequent re-ranking of candidate synthetic questions. In an embodiment, a baseline ranking may be performed before performing further ranking to simplify computation. For example, a baseline ranking may be utilized to identify a "top" subset of candidate synthetic questions, and a subset of candidate synthetic questions may undergo a re-ranking operation.

In an embodiment, a baseline ranking may include a first aspect comprising determining a likelihood score. For example, a likelihood score may be computed for a query/template pair $(q_i; t_j)$ at least in part by averaging similarity scores $sim(q; q_i)$ between a new query q and n similar queries $q_i$ that may be associated with template $t_j$. Individual similarity scores may be computed, in an embodiment, as a product of a term similarity between terms in respective positions in the two queries. For example, $sim(q; q_i)=\Pi_k sim(q^k; q_i^k)$, where $q^k$ and $q_i^k$ comprise the $k^{th}$ terms of queries q and $q_i$ respectively. A similarity $sim(q^k; q_i^k)$ between two terms may be measured, in an embodiment, by a cosine similarity between their respective context vectors. In an example query/question database, millions of queries may be processed to compute context vectors, although claimed subject matter is of course not limited in scope in this respect.

A second aspect of a baseline ranking may comprise determining a language model score for individual candidate synthetic questions. In an embodiment, a language model score may represent an indication of grammatical correctness for a respective candidate synthetic question. In an embodiment, a machine-learning language model may be trained based at least in part on a sampling of approximately fifteen million English questions from CQA site Yahoo! Answers, although of course claimed subject matter is not limited in scope in this respect. In an embodiment, candidate synthetic questions may be individually represented by a vector, as mentioned above. A linear model may be utilized for scoring individual candidate synthetic question vectors of a candidate synthetic question pool: $\mu \cdot \Phi(Q)$, wherein $\mu$ comprises a model weight vector and $\Phi(Q)$ comprises a feature vector of candidate synthetic question Q. In an embodiment, weights may be trained utilizing an average variant of a Passive Aggressive (PA) online learning process, for example, although claimed subject matter is not limited in scope in this respect.

In an embodiment, a baseline score based, as an example approach, on two example aspects described above may be expressed as:

$$\text{Baseline score} = \lambda \cdot \text{Likelihood}(\text{Query, Template}) + (1-\lambda) \cdot \text{LanguageModel}(\text{Question}) \quad (1)$$

As mentioned above, baseline ranking scores for individual candidate synthetic questions of a set of candidate synthetic questions may be utilized to select a subset of candidate synthetic questions to be re-ranked as part of an example synthetic question generation operation. To re-rank a selected subset of candidate synthetic questions, for example, individual candidate synthetic questions may tagged with part of speech (POS) tags, and/or a dependency parse tree may be generated for individual candidate synthetic questions, in an embodiment. Also, in an embodiment, a POS machine-learning language model may be trained utilizing the same or approximately the same fifteen million English questions from CQA site Yahoo! Answers utilized to train the language model mentioned above, although claimed subject matter is not limited in scope in this respect.

Figure 8:
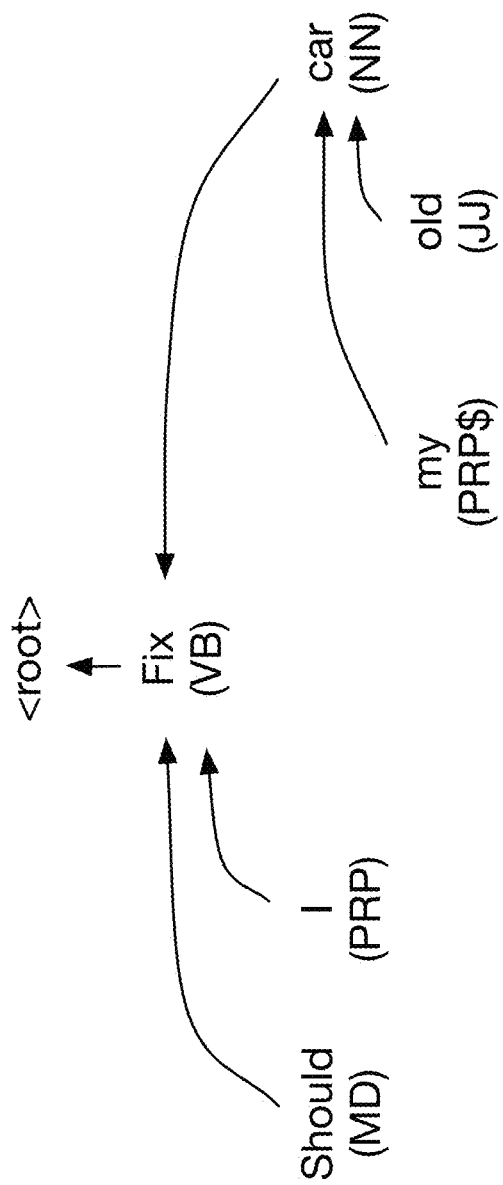
FIG. 8 is an illustration of an example part of speech tagging and/or dependency parse tree, in accordance with an embodiment.

In addition to POS tagging, re-ranking may comprise dependency relationship evaluation. In an embodiment, POS tagging and/or dependency analysis of candidate synthetic questions may be accomplished at least in part utilizing Stanford Natural Language Processing (NLP) tools, although claimed subject matter is not limited in scope in this respect. In performing dependency relationship evaluation for candidate synthetic questions, a parse tree for individual candidate synthetic questions may be generated. As an example, a parse tree for example candidate synthetic question "should I fix my old car?" is depicted at FIG. 8. In an embodiment, features 'should->fix', 'I->fix', 'car->fix', 'MD->VB', 'PRP->VB', 'NN->VB', 'M->V', 'P->V' and 'N->V' may be derived from a parse tree such as the example depicted in FIG. 8. Parse tree features may capture semantic coherence such as verb selection preferences, for example. In an embodiment, an advantage of parse tree features may comprise an ability to indicate relationships between words that may generally be too dissimilar to be assessed using a conventional language model. In an embodiment, relationships between a root word and its dependents, as depicted by the uppermost elements of a parse tree, for example, may reflect an overall level of quality for a candidate synthetic question.

In an embodiment, in addition to providing a set of synthetic questions that are relevant to a user's area of interest, for example, as specified by a user query, in an embodiment, it may be desirable to provide a more diverse set of synthetic questions to a user, at least in part so that a user may choose from range of questions that may be more likely to reflect latent intent, for example. In an embodiment, improved diversification may be accomplished, at least in part, by reducing redundant and/or similar synthetic questions. In another embodiment, more diversification may be achieved, at least in part, by generating synthetic questions in different synthetic question forms.

With respect to achieving question diversity by generating different question forms, an example embodiment may select synthetic questions that start with different words for display to a user, such as, for example, a "white list" of question words. For example, if two candidate questions begin with different words, there is an improved chance that underlying meanings may differ, as well. In an embodiment, a list of ranked candidate questions may be examined starting from the top, and if a candidate question is determined to start with the same word as a previous candidate question, that particular candidate question may be eliminated as a candidate to serve as a synthetic question to be displayed to a user. In an embodiment, a process embodiment, such as described above, for selecting candidate questions with different first words may be referred to herein as a "first-word" filter.

As mentioned above, more diversity among synthetic questions may also be achieved, at least in part, by reducing redundant and/or similar questions, in an embodiment. As used herein, the term "redundant questions" may refer to questions that differ by a few interchangeable terms, such as terms that may be exchanged one for the other without significantly changing question meaning. In an embodiment, for example, a list of interchangeable term pairs may be generated and/or maintained, and redundancy between questions may be measured at least in part by way of a term-type edit-distance metric. For example, in an embodiment, an edit-distance metric may be determined by assigning a cost of "1" to low cost edit operations, such as, for example, replacement between two interchangeable terms. Also, in an embodiment, a cost of infinity may be assigned to other more complex edit operations. In an embodiment, two questions may be considered to be redundant if the edit-distance between them is lower than a specified threshold. For example, if an edit-distance redundancy threshold is specified as three, two questions that differ by two or less interchangeable terms may be considered to be redundant. Otherwise, the questions may be considered to be non-redundant. Of course, this is merely one example embodiment and claimed subject matter is not limited in scope to this particular example.

However, continuing with an example approach, in an embodiment, to determine edit-distance metrics for candidate synthetic questions, it may be advantageous to store a database of pairs of interchangeable terms. A sampling of interchangeable terms is provided below in Table 1:

TABLE 1

| Example Interchangeable Pairs | | | |
| --- | --- | --- | --- |
| can/could | could/should | can/do | a/the |
| term/word | type/kind | get/download | buy/get |
| cool/cute | fun/good | ok/normal | possible/legal |
| u/you | computer/pc | okay/ok | site/website |
| do/don't | bad/ok | girls/guys | my/your |
| really/- | exactly/- | often/- | always/- |

In an embodiment, pairs of terms may be extracted from a set of questions in a manner capable of being implemented via a computing device for improved efficiency. For example, terms may be extracted based at least in part on an assumption in which terms that appear in a same and/or similar context in a relatively large number of different questions may be considered interchangeable. For individual queries, top generated questions may be evaluated and pairs of questions that differ by one term, for example, may be identified. A corresponding term pair for respective occurrences may be recorded and/or stored. Additionally, in an embodiment, a term may to be replaced by a blank in the case of a deletion operation, and such a pairing may also be considered to be interchangeable. Further, two terms may be considered to be interchangeable if a pair of the two terms is observed for a relatively large number of individual queries. In an embodiment, a resulting database of redundant pairs may comprise approximately 500 pairs of interchangeable terms, some examples of which are shown above in Table 1. However, claimed subject matter is not limited in scope to the particular examples described herein.

As mentioned above, quality of a candidate question may be estimated based at least in part on a logistical mathematical function, in an embodiment. Also, in an embodiment, parameters of the logistical mathematical function may be determined at least in part through offline training of a machine learning tool. For example, in an embodiment, a test set of queries may be sampled, and for individual queries, a plurality of questions ranked above a specified threshold may be analyzed by one or more human users. Also, in an embodiment, human users may assign grades for one or more aspects of the synthetic questions. For example, human users may provide grades related to a synthetic question's content based on a question's relevance to the query, and/or may provide grades related to a synthetic question's grammatical correctness, in an embodiment. For example, a human user may assign either "good" or a "poor" grades related to a particular question's content and/or grammar. Also, as mentioned, grades provided by human users for synthetic questions related to test set queries may be utilized to train a machine learning tool, and the machine learning tool may be utilized to determine one or more parameters of the logistical mathematical function that may be utilized to estimate the quality of candidate questions, in an embodiment.

In an embodiment, individual candidate questions may be represented as a feature vector. For example, a candidate question may be represented by a feature vector describing one or more characteristics of the candidate question including, but not limited to, characteristics related to question length, language model scores, template matching scores, question type, rank position, whether query terms are kept in a question, whether query terms are kept in order within a question, query length, whether a candidate question is similar to other candidate questions, for example. Of course, claimed subject matter is not limited in scope in these respects.

Referring again to FIG. 6, one or more synthetic questions, selected from top-ranked candidate questions according to example processes described above, for example, may be transmitted from synthetic question component 630 to computing device 660, in an embodiment. Additionally, one or more synthetic questions may be stored in a question/query database 640, in an embodiment. Of course, system 600 is merely an example system, and claimed subject matter is not limited in scope in this respect.

Figure 7:
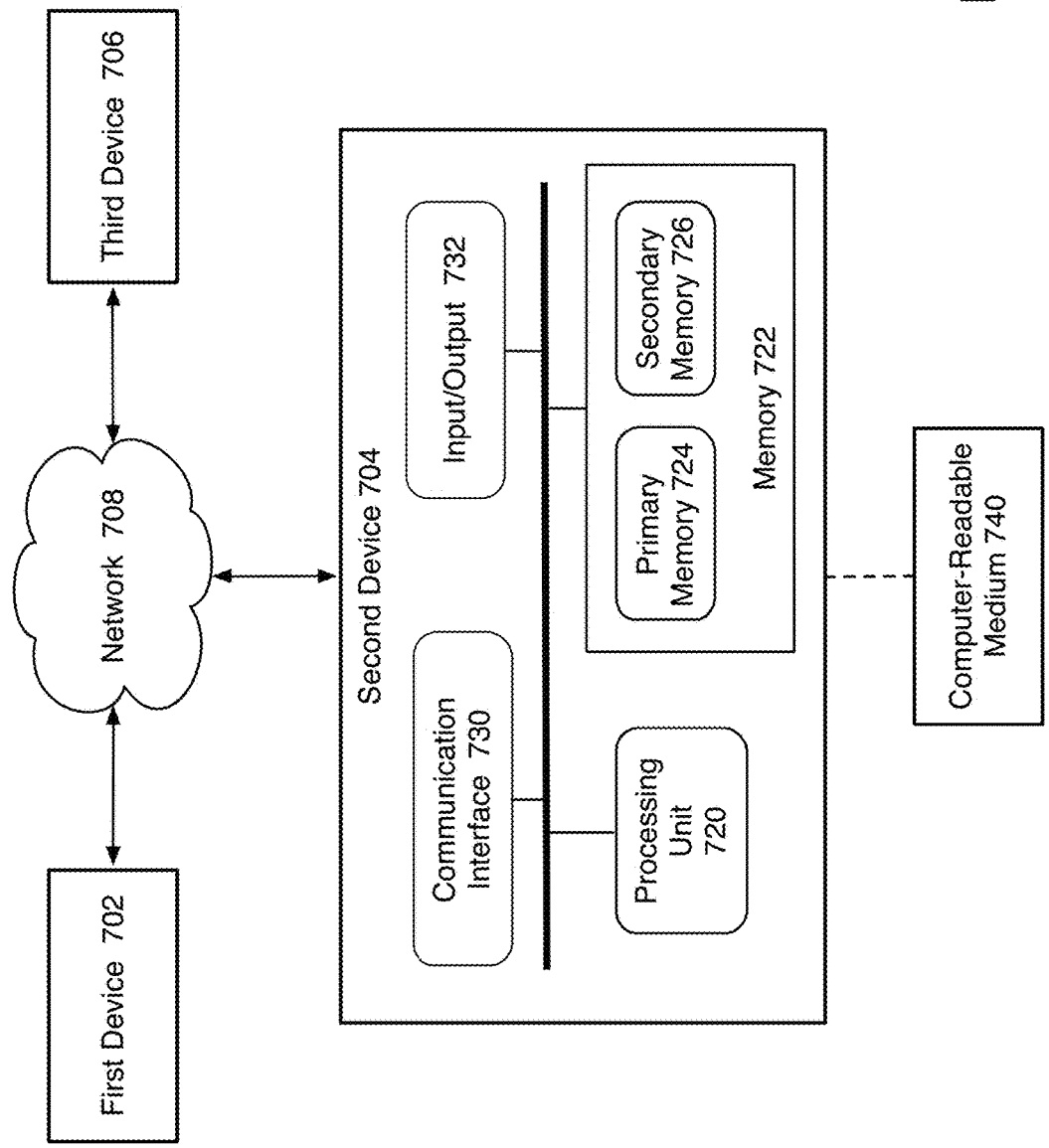
FIG. 7 is a schematic diagram illustrating an example computing device in accordance with an embodiment.

FIG. 7 is a block diagram illustrating an example system comprising a plurality of computing devices coupled via a network in accordance with an embodiment. For purposes of illustration, FIG. 7 is an illustration of an embodiment of a computing platform or computing device 704 that may be employed in a client-server type interaction, such as described infra. In FIG. 7, computing device 704, which may comprise features of a server computing device, may interface with a computing device 702, which may comprise features of a client device, for example. In other embodiments, computing device 704 may comprise a client computing device, and computing device 702 may comprise a server computing device, for example. In an embodiment, communications interface 730, processor (e.g., processing unit) 720, and memory 722, which may comprise primary memory 724 and secondary memory 726, may communicate by way of communication bus 728, for example. In FIG. 7, computing device 704 may store various forms of content, such as analog, uncompressed digital, lossless compressed digital, or lossy compressed digital formats for content of various types, such as video, imaging, text, audio, etc. in the form physical states or signals, for example. Computing device 704 may communicate with computing device 702 and/or with computing device 706 by way of an Internet connection via network 708, for example. Although the computing device 704 of FIG. 7 shows the above-identified components, claimed subject matter is not limited to computing platforms having only these components as other implementations may include alternative arrangements that may comprise additional components, fewer components, or components that function differently while achieving similar results. Rather, examples are provided merely as illustrations. It is not intended that claimed subject matter to limited in scope to illustrative examples.

Processor 720 may be representative of one or more circuits, such as digital circuits, to perform at least a portion of a computing procedure or process. By way of example but not limitation, processor 720 may comprise one or more processors, such as controllers, microprocessors, microcontrollers, application specific integrated circuits, digital signal processors, programmable logic devices, field programmable gate arrays, and the like, or any combination thereof. In implementations, processor 720 may perform signal processing to manipulate signals or states or to construct signals or states, for example.

Memory 722 may be representative of any storage mechanism. Memory 722 may comprise, for example, primary memory 724 and secondary memory 726, additional memory circuits, mechanisms, or combinations thereof may be used. Memory 722 may comprise, for example, random access memory, read only memory, or one or more data storage devices or systems, such as, for example, a disk drive, an optical disc drive, a tape drive, a solid-state memory drive, just to name a few examples. Memory 722 may be utilized to store a program, as an example. Memory 722 may also comprise a memory controller for accessing computer readable-medium 740 that may carry and/or make accessible content, code, and/or instructions, for example, executable by processor 720 or some other controller or processor capable of executing instructions, for example. Also, in an embodiment, memory 722 may store a local database cache, for example.

Under the direction of processor 720, memory, such as cells storing physical states, representing for example, a program, may be executed by processor 720 and generated signals may be transmitted via the Internet, for example. Processor 720 may also receive digitally-encoded signals from server 704.

Network 708 may comprise one or more communication links, processes, and/or resources to support exchanging communication signals between a client and server, which may, for example, comprise one or more servers (not shown). By way of example, but not limitation, network 708 may comprise wireless and/or wired communication links, telephone or telecommunications systems, Wi-Fi networks, Wi-MAX networks, the Internet, the web, a local area network (LAN), a wide area network (WAN), or any combination thereof.

The term "computing device," as used herein, refers to a system and/or a device, such as a computer, that includes a capability to process and/or store data in the form of signals and/or states. Thus, a computing device, in this context, may comprise hardware, software, firmware, or any combination thereof (other than software per se). Computing device 704, as depicted in FIG. 7, is merely one such example, and the scope of claimed subject matter is not limited to this particular example. For one or more embodiments, a computing device may comprise any of a wide range of digital electronic devices, including, but not limited to, personal desktop or notebook computers, high-definition televisions, digital versatile disc (DVD) players and/or recorders, game consoles, satellite television receivers, cellular telephones, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing device.

Memory 722 may store cookies relating to one or more users and may also comprise a computer-readable medium that may carry and/or make accessible content, code and/or instructions, for example, executable by processor 720 or some other controller or processor capable of executing instructions, for example. A user may make use of an input device, such as a computer mouse, stylus, track ball, keyboard, or any other device capable of receiving an input from a user.

Regarding aspects related to a communications or computing network, a wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, and/or the like, which may move freely, randomly or organize themselves arbitrarily, such that network topology may change, at times even rapidly. Wireless network may further employ a plurality of network access technologies, including Long Term Evolution (LTE), WLAN, Wireless Router (WR) mesh, or 2nd, 3rd, or 4th generation (2G, 3G, or 4G) cellular technology, or other technologies, or the like. Network access technologies may enable wide area coverage for devices, such as client devices with varying degrees of mobility, for example.

A network may enable radio frequency or wireless type communications via a network access technology, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or other, or the like. A wireless network may include virtually any type of now known, or to be developed, wireless communication mechanism by which signals may be communicated between devices, such as a client device or a computing device, between or within a network, or the like.

Communications between a computing device and a wireless network may be in accordance with known, or to be developed cellular telephone communication network protocols including, for example, global system for mobile communications (GSM), enhanced data rate for GSM evolution (EDGE), and worldwide interoperability for microwave access (WiMAX). A computing device may also have a subscriber identity module (SIM) card, which, for example, may comprise a detachable smart card that stores subscription information of a user, and may also store a contact list of the user. A user may own the computing device or may otherwise be its primary user, for example. A computing device may be assigned an address by a wireless or wired telephony network operator, or an Internet Service Provider (ISP). For example, an address may comprise a domestic or international telephone number, an Internet Protocol (IP) address, and/or one or more other identifiers.

In other embodiments, a communication network may be embodied as a wired network, wireless network, or combination thereof.

A computing device may vary in terms of capabilities or features. Claimed subject matter is intended to cover a wide range of potential variations. For example, a network device may include a numeric keypad or other display of limited functionality, such as a monochrome liquid crystal display (LCD) for displaying text. In contrast, however, as another example, a web-enabled computing device may include a physical or a virtual keyboard, mass storage, one or more accelerometers, one or more gyroscopes, global positioning system (GPS) or other location-identifying type capability, and/or a display with a higher degree of functionality, such as a touch-sensitive color 2D or 3D display, for example.

A computing device may include or may execute a variety of now known, or to be developed operating systems, or derivatives and/or versions, including personal computer operating systems, such as a Windows, iOS or Linux, or a mobile operating system, such as iOS, Android, or Windows Mobile, or the like. A computing device may include or may execute a variety of possible applications, such as a client software application enabling communication with other devices, such as communicating one or more messages, such as via email, short message service (SMS), or multimedia message service (MMS), including via a network, such as a social network including, but not limited to, Facebook, LinkedIn, Twitter, Flickr, or Google-F, to provide only a few examples. A computing device may also include or execute a software application to communicate content, such as, for example, textual content, multimedia content, or the like. A computing device may also include or execute a software application to perform a variety of possible tasks, such as browsing, searching, playing various forms of content, including locally stored or streamed video, or games such as, but not limited to, fantasy sports leagues. The foregoing is provided merely to illustrate that claimed subject matter is intended to include a wide range of possible features or capabilities.

A network including a computing device, for example, may also be extended to another device communicating as part of another network, such as via a virtual private network (VPN). To support a VPN, transmissions may be forwarded to the VPN device. For example, a software tunnel may be created. Tunneled traffic may, or may not be encrypted, and a tunneling protocol may be substantially complaint with or substantially compatible with any past, present or future versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, or another existing protocol, or another protocol that may be developed.

A network may be compatible with now known, or to be developed, past, present, or future versions of any, but not limited to the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, or X.25. A network may employ, for example, TCP/IP, UDP, DECnet, NetBEUI, IPX, Appletalk, other, or the like. Versions of the Internet Protocol (IP) may include IPv4, IPv6, other, and/or the like.

It will, of course, be understood that, although particular embodiments will be described, claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example (other than software per se). Likewise, although claimed subject matter is not limited in scope in this respect, one embodiment may comprise one or more articles, such as a storage medium or storage media. Storage media, such as, one or more CD-ROMs and/or disks, for example, may have stored thereon instructions, executable by a system, such as a computer system, computing platform, or other system, for example, that may result in an embodiment of a method in accordance with claimed subject matter being executed, such as a previously described embodiment, for example; although, of course, claimed subject matter is not limited to previously described embodiments. As one potential example, a computing platform may include one or more processing units or processors, one or more devices capable of inputting/outputting, such as a display, a keyboard and/or a mouse, and/or one or more memories, such as static random access memory, dynamic random access memory, flash memory, and/or a hard drive.

In the preceding detailed description, numerous specific details have been set forth to provide a thorough understanding of claimed subject matter. However, it will be understood by those skilled in the art that claimed subject matter may be practiced without these specific details. In other instances, methods and/or apparatuses that would be known by one of ordinary skill have not been described in detail so as not to obscure claimed subject matter. Some portions of the preceding detailed description have been presented in terms of logic, algorithms and/or symbolic representations of operations on binary signals or states, such as stored within a memory of a specific apparatus or special purpose computing device or platform. In the context of this particular specification, the term specific apparatus or the like includes a general purpose computing device, such as general purpose computer, once it is programmed to perform particular functions pursuant to instructions from program software.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involves physical manipulation of physical quantities. Typically, although not necessarily, such quantities may take the form of electrical and/or magnetic signals and/or states capable of being stored, transferred, combined, compared, processed or otherwise manipulated as electronic signals and/or states representing information. It has proven convenient at times, principally for reasons of common usage, to refer to such signals and/or states as bits, data, values, elements, symbols, characters, terms, numbers, numerals, information, and/or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing device. In the context of this specification, therefore, a special purpose computer and/or a similar special purpose computing device is capable of processing, manipulating and/or transforming signals and/or states, typically represented as physical electronic and/or magnetic quantities within memories, registers, and/or other information storage devices, transmission devices, and/or display devices of the special purpose computer and/or similar special purpose computing device. In the context of this particular patent application, as mentioned, the term "specific apparatus" may include a general purpose computing device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

While there has been illustrated and/or described what are presently considered to be example features, it will be understood by those skilled in the relevant art that various other modifications may be made and/or equivalents may be substituted, without departing from claimed subject matter. Additionally, many modifications may be made to adapt a particular situation to the teachings of claimed subject matter without departing from one or more central concept (s) described herein. Therefore, it is intended that claimed subject matter not be limited to the particular examples disclosed, but that such claimed subject matter may also include all aspects falling within appended claims and/or equivalents thereof.

The invention claimed is:

1. A method, comprising:
   generating, utilizing at least in part a processor of a computing device, a search results web page including one or more search results based at least in part on one or more user-provided query terms and further including one or more synthetic questions also based at least in part on the one or more user-provided query terms, wherein the generating the search results web page includes:
   generating a set of candidate synthetic questions based at least in part on the one or more user-provided query terms,
   ranking the set of candidate synthetic questions, performing a diversity function on at least a subset of the ranked set of candidate synthetic questions to generate a plurality of diversified candidate synthetic questions, and estimating respective quality scores for the plurality of diversified candidate synthetic questions;

communicating the search results web page between the computing device and a user computing device; and directing the user to one or more online community question answering sites at least in part via communication of one or more community question answering site web pages between the computing device and the user computing device at least in part in response to obtaining a user selection of a particular synthetic question of the one or more synthetic questions.

2. The method of claim 1, wherein the directing the user to the one or more online community question answering sites further comprises:

submitting the particular synthetic question to the one or more online community question answering sites.

3. The method of claim 1, wherein the ranking the set of candidate synthetic questions comprises ranking the set of candidate synthetic questions at least in part according to a machine learning-to-rank function or at least in part according to a natural language function, or a combination thereof.

4. The method of claim 3, wherein the ranking the set of candidate synthetic questions at least in part according to the machine learning-to-rank function or at least in part according to the natural language function, or the combination thereof, comprises ranking the set of candidate synthetic questions based at least in part on part of speech tags or dependency trees, or a combination thereof, generated for individual synthetic questions of the set of candidate synthetic questions.

5. The method of claim 1, wherein the generating the search results page including the one or more synthetic questions further comprises identifying one or more of the plurality of diversified candidate synthetic questions to have respective estimated quality scores that at least meet a specified threshold.

6. The method of claim 1, wherein the diversity function comprises employing a first-word filter or an edit-distance filter, or a combination thereof, for the at least the subset of the ranked set of candidate synthetic questions.

7. The method of claim 5, wherein the estimating the respective quality scores for the plurality of diversified candidate synthetic questions comprises offline training of a machine learning tool.

8. A method comprising:

generating, utilizing at least in part a processor of a computing device, a search results web page including one or more search results based at least in part on one or more user-provided query terms and further including one or more synthetic questions also based at least in part on the one or more user-provided query terms;

communicating the search results web page between the computing device and a user computing device;

directing the user to one or more online community question answering sites at least in part via communication of one or more community question answering site web pages between the computing device and the user computing device at least in part in response to obtaining a user selection of a particular synthetic question of the one or more synthetic questions; and generating one or more additional synthetic questions for display to the user via the one or more online community question answering site web pages based at least in part on the obtaining the user selection of the particular synthetic question to encourage search refinement.

9. An article, comprising: a non-transitory storage medium having stored thereon instructions executable by a computing device to:

generate a search results web page for display to a user to include one or more search results based at least in part on one or more user-provided query terms and further to include one or more synthetic questions also based at least in part on the one or more user-provided query terms, wherein, to generate the search result web page, the storage medium having stored thereon further instructions executable by the computing device to:

generate a set of candidate synthetic questions based at least in part on the one or more user-provided query terms, rank the set of candidate synthetic questions, and identify one or more of the plurality of diversified candidate synthetic questions to have respective estimated quality scores that at least meet a specified threshold, wherein, to generate the plurality of synthetic questions, the storage medium having stored thereon further instructions executable by the computing device to perform a diversity function on at least a subset of the ranked set candidate synthetic questions to generate a plurality of diversified candidate synthetic questions;

communicate between the computing device and a user computing device the search results web page; and direct the user to one or more online community question answering sites at least in part via communication of one or more community question answering site web pages between the computing device and the user computing device at least in part in response to obtaining a user selection of a particular synthetic question of the one or more synthetic questions.

10. The article of claim 9, wherein, to direct the user to the one or more online community question answering sites, the storage medium having stored thereon further instructions executable by the computing device to:

submit the particular synthetic question to the one or more online community question answering sites.

11. The article of claim 9, wherein the storage medium having stored thereon further instructions executable by the computing device to rank the set of candidate synthetic questions at least in part in accordance with a machine learning-to-rank function or at least in part in accordance with a natural language function, or a combination thereof.

12. The article of claim 11, wherein the storage medium having stored thereon further instructions executable by the computing device to rank the set of candidate synthetic questions based at least in part on part of speech tags or dependency trees, or a combination thereof, to be generated for individual questions of the set of candidate synthetic questions.

13. The article of claim 9, wherein the storage medium having stored thereon further instructions executable by the computing device to generate one or more additional synthetic questions for display to the user via the one or more online community question answering site web pages based at least in part on the user selection of the particular synthetic question to encourage search refinement.

14. An apparatus, comprising:

means for generating at a computing device a search results web page for display to a user including one or more search results based at least in part on one or more user-provided query terms and further including one or more synthetic questions also based at least in part on the one or more user-provided query terms, wherein the means for generating the search results web page includes:

means for generating a set of candidate synthetic questions based at least in part on the one or more user-provided query terms, means for ranking the set of candidate synthetic questions, means for performing a diversity function on at least a subset of the ranked set of candidate synthetic questions to generate a plurality of diversified candidate synthetic questions, and means for estimating respective quality scores for the plurality of diversified candidate synthetic questions;

means for communicating the search results web page between the computing device and a user computing device; and means for directing the user to one or more online community question answering sites at least in part via communication of one or more community question answering site web pages between the computing device and the user computing device at least in part in response to obtaining a user selection of a particular synthetic question of the one or more synthetic questions.

15. The apparatus of claim 14, wherein the means for directing the user to the one or more online community question answering sites further comprises:

means for submitting the particular synthetic question to the one or more online community question answering sites.

\* \* \* \* \*